United States Patent
Betschon et al.

(10) Patent No.: US 9,377,376 B2
(45) Date of Patent: Jun. 28, 2016

(54) TEST APPARATUS FOR ELECTRO-OPTICAL PRINTED CIRCUIT BOARDS

(71) Applicant: vario-optics ag, Heiden (CH)

(72) Inventors: Felix Betschon, St. Gallen (CH); Stefan Beyer, Oberegg (CH); David Bischof, Sulz (AT); Markus Halter, Diepoldsau (CH); Johannes Kremmel, Feldkirch (AT); Tobias Lamprecht, Berneck (CH); Markus Michler, Feldkirch (AT)

(73) Assignee: VARIO-OPTICS AG, Heiden (CH)

( * ) Notice: Subject to any disclaimer, the term of this patent is extended or adjusted under 35 U.S.C. 154(b) by 0 days.

(21) Appl. No.: 14/550,693

(22) Filed: Nov. 21, 2014

(65) Prior Publication Data
US 2015/0146195 A1    May 28, 2015

(30) Foreign Application Priority Data

Nov. 22, 2013   (CH) .................................. 1949/13

(51) Int. Cl.
| | | |
|---|---|---|
| *G01N 21/00* | (2006.01) | |
| *G01M 11/00* | (2006.01) | |
| *H04B 10/03* | (2013.01) | |
| *H04B 10/077* | (2013.01) | |

(52) U.S. Cl.
CPC ................ *G01M 11/33* (2013.01); *H04B 10/03* (2013.01); *H04B 10/0775* (2013.01)

(58) Field of Classification Search
CPC ................. G01M 11/33; G01M 11/37; H04Q 2011/0083; H04B 10/07955; H04B 10/0075; H04B 10/03

See application file for complete search history.

(56) References Cited

U.S. PATENT DOCUMENTS

| | | | | |
|---|---|---|---|---|
| 6,678,437 | B2* | 1/2004 | Qian | G02B 6/3588 385/17 |
| 7,050,670 | B2* | 5/2006 | Schroeder | G02B 6/32 385/17 |
| 2004/0091200 | A1* | 5/2004 | Ikegame | G02B 6/3546 385/18 |
| 2011/0013905 | A1* | 1/2011 | Wang | G01M 11/33 398/21 |

FOREIGN PATENT DOCUMENTS

| | | |
|---|---|---|
| GB | 2 082 012 A | 2/1982 |
| GB | 2 128 839 A | 5/1984 |

OTHER PUBLICATIONS

Synergy Optosystems Co., Ltd. (Japan), Brochure entitled "Optical Continuity Tester", Date: Approximately Jun. 1, 2010.
(Continued)

*Primary Examiner* — Michael A Lyons
*Assistant Examiner* — Maurice Smith
(74) *Attorney, Agent, or Firm* — Nixon Peabody LLP

(57) ABSTRACT

A test apparatus for electro-optical printed circuit boards having optical waveguides comprises a control device, a beamer and a camera, which can be positioned in such a way that light emitted by the beamer can be coupled by means of a first deflecting element to optical waveguides of the circuit board and can be coupled out by means of a second deflecting element into the field of vision of the camera. The beamer is used in a first phase to determine the position for each deflecting mirror of the first deflecting element which a light spot needs to assume in the image projected by the beamer so that the light spot illuminates the deflecting mirror. The beamer is used in a second phase to illuminate at least one deflecting mirror and to carry out the testing of the optical waveguide associated with the at least one deflecting mirror.

6 Claims, 4 Drawing Sheets

(56) References Cited

OTHER PUBLICATIONS

Figure 1:
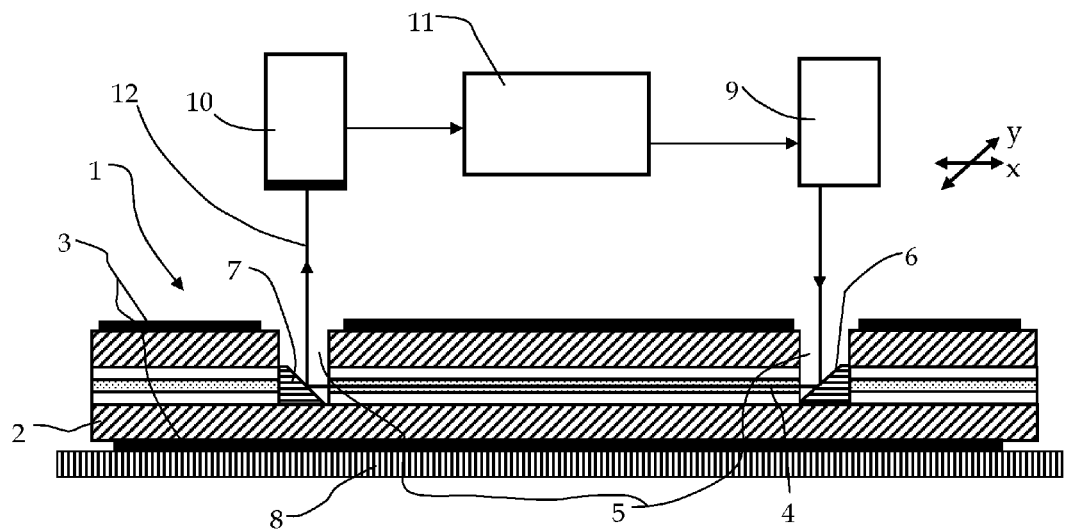

Immonen, Marika et al., "Fabrication and Characterization of Polymer Optical Waveguides With Integrated Micromirrors for Three-Dimensional Board-Level Optical Interconnects", IEEE Transactions on Electronics Packaging Manufacturing, vol. 28, No. 4, Oct. 2005, pp. 304-311.

Lowry, H.S. et al., "Use of AEDC's laser-based direct-write scene generator to drive NAWC's fiber array projector", Proc. SPIE 3699, Targets and Backgrounds: Characterization and Representation V, Jul. 1999, pp. 240-248.

European Search Report in European Patent Application No. 14 19 3011, dated May 8, 2015.

* cited by examiner

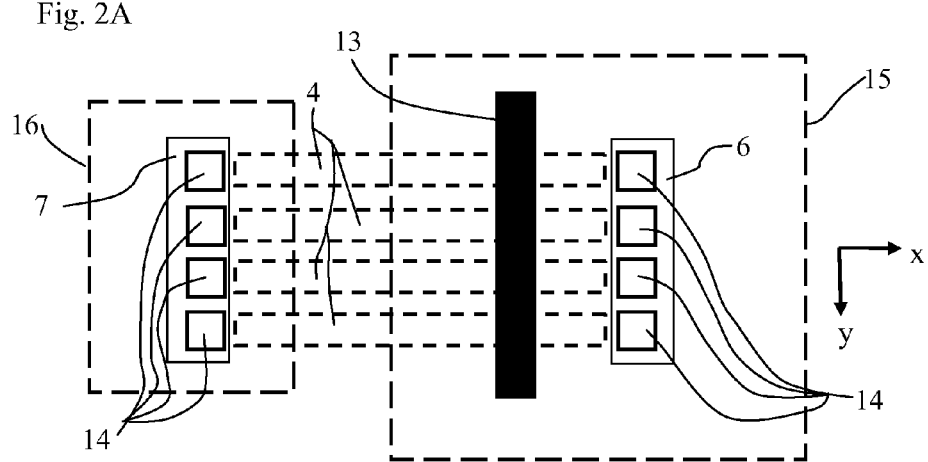
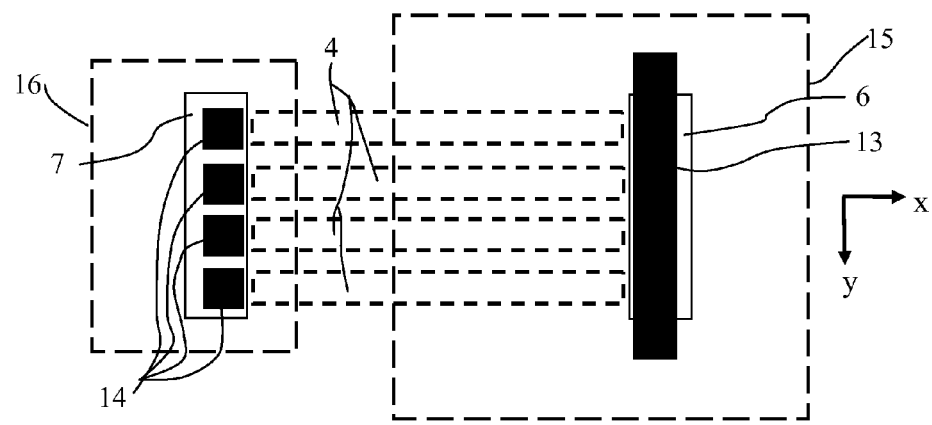
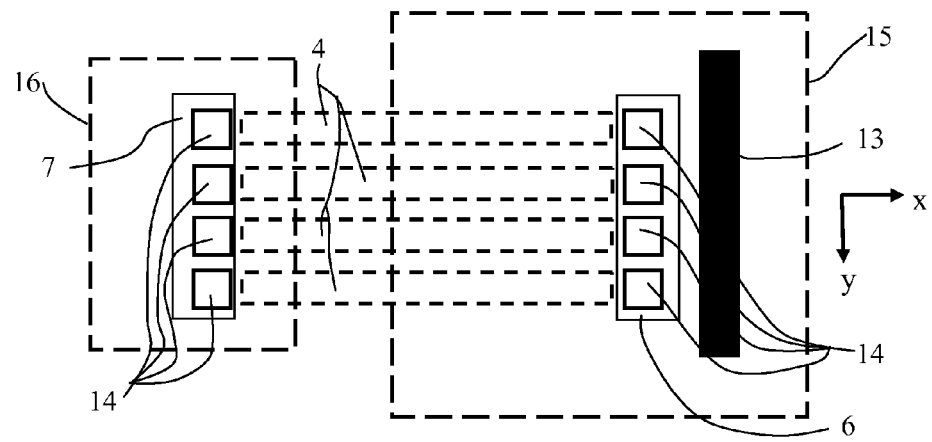

TEST APPARATUS FOR ELECTRO-OPTICAL PRINTED CIRCUIT BOARDS

PRIORITY CLAIM

Applicant hereby claims foreign priority under 35 U.S.C. §119 from Swiss Application No. 01949/13 filed Nov. 22, 2013, the disclosure of which is herein incorporated by reference.

FIELD OF THE INVENTION

The invention relates to a test apparatus for electro-optical printed circuit boards. Such printed circuit boards contain a plurality of optical waveguides, which are also known as optical channels, and electrical connection lines.

BACKGROUND OF THE INVENTION

Testing of the optical waveguides is realized by means of a light source (laser, LED, optical fiber, etc) and an optical receiver (photodiode with or without optics). The optical losses and thus the quality of the optical waveguides can thus be measured very precisely. It is necessary however that the light source and the receiver are aligned very precisely to the optical waveguide. In the case of a large number of optical waveguides, this process is very time-consuming and therefore impractical, because the light source and the receiver need to be aligned individually for each optical waveguide. A test apparatus is also known which comprises a light source that illuminates a relatively large area of the circuit board, a camera and a control device.

SHORT DESCRIPTION OF THE INVENTION

The invention is based on the object of providing a test apparatus for electro-optical printed circuit boards which also operates rapidly with a large number of optical waveguides per circuit board.

According to the invention a test apparatus for electro-optical printed circuit boards having optical waveguides comprises
a retainer for accommodating an electro-optical printed circuit board,
a beamer,
a camera, and
a control device, wherein the beamer and the camera are configured to be positioned in such a way that light emitted by the beamer may be fed by means of at least one deflecting element into one or more of the optical waveguides of the electro-optical printed circuit board and may be coupled out into the field of vision of the camera by means of at least one further deflecting element, wherein each of the deflecting elements contains several deflecting mirrors and wherein each optical waveguide of the electro-optical printed circuit board is associated with a deflecting mirror of a first deflecting element and a deflecting mirror of a second deflecting element, and wherein the control device is set up
in a first phase
  to move a first light bar projected by the beamer step-by-step along a first direction over the first deflecting element and to take in each step an image with the camera, wherein the first light bar extends orthogonally to the first direction;
  to pick as a first set of images those images from the images supplied by the camera in which at least one deflecting mirror of the second deflecting element lights up;
  to move a second light bar projected by the beamer step-by-step along a second direction over the first deflecting element and to take in each step an image with the camera, wherein the second light bar extends orthogonally to the second direction;
  to pick as a second set of images those images from the images supplied by the camera in which at least one deflecting mirror of the second deflecting element lights up, and
  to determine from the first set and the second set of images for each of the optical waveguides to be tested the position which a light spot needs to assume in the image generated by the beamer so that the light spot exclusively illuminates the deflecting mirror of the first deflecting element which is associated with the optical waveguide to be tested;
and wherein in a second phase the control device is set up for each of the optical waveguides to be tested
  to project with the beamer a light spot onto the deflecting mirror associated with the optical waveguide to be tested on the basis of the position determined in the first phase, wherein the light spot does not illuminate any deflecting mirror which is associated with an optical waveguide adjacent to the optical waveguide to be tested,
  to record an image by means of the camera, and
  to determine a quality of the optical waveguide on the basis of the image.

The control device and the beamer form a light pattern generator for producing images of bright and dark pixels. A sequence of images may be produced to form a movie, e.g. a movie showing a moving light bar.

The test apparatus may further be configured to detect a potential cross coupling between the optical waveguide to be tested and another of the optical waveguides of the electro-optical printed circuit board on the basis of the image recorded by the camera.

The test apparatus may further comprise at least one adapter plate with resiliently mounted deflecting elements which are automatically introduced into the cavities during the test.

The adapter plates may additionally comprise needles in order to make contact with one or more electrical conductors of the electro-optical printed circuit board.

BRIEF DESCRIPTION OF THE DRAWING FIGURES

Figure 3A:
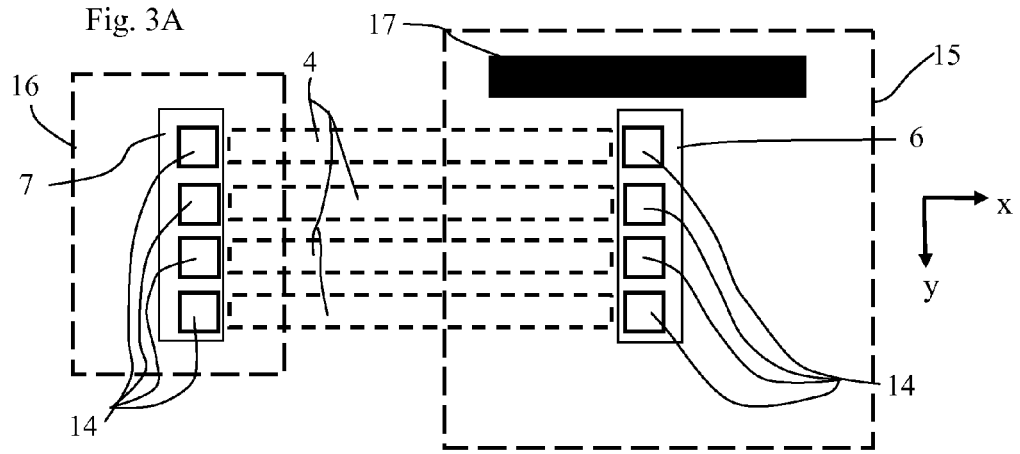
Figure 3B:
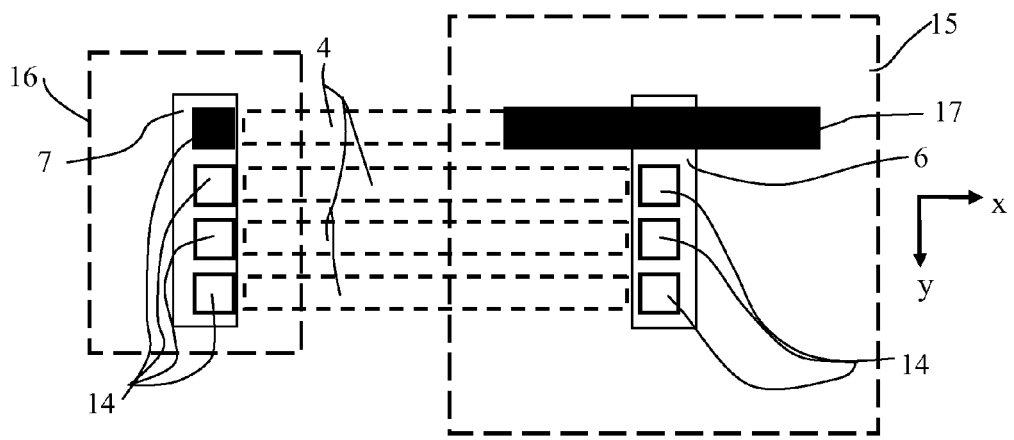
Figure 3C:
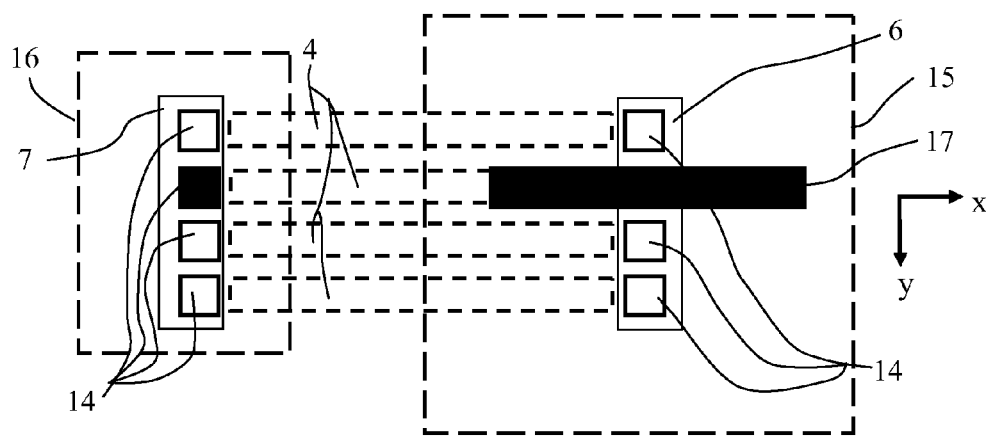
Figure 4A:
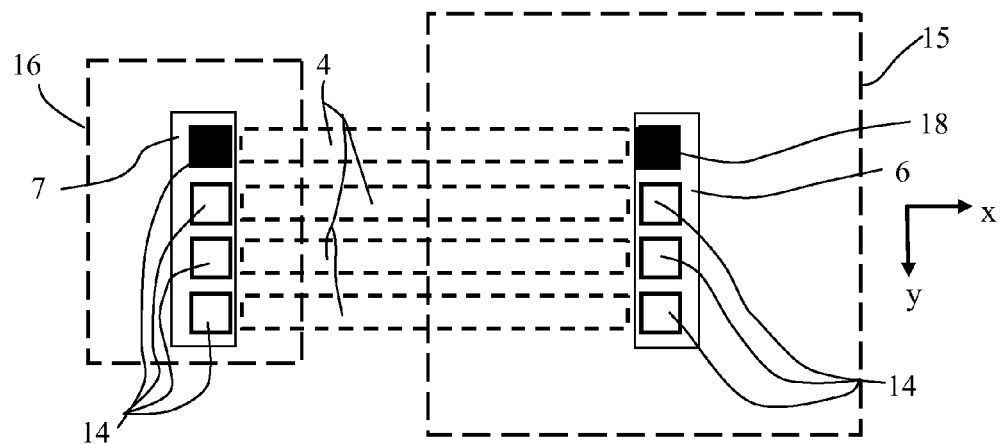

The accompanying drawings, which are incorporated into and constitute a part of this specification, illustrate one or more embodiments of the present invention and, together with the detailed description, serve to explain the principles and implementations of the invention. The figures are not drawn to scale. In the drawings:

FIG. 1 schematically shows a test apparatus in accordance with the invention for electro-optical printed circuit boards;

FIGS. 2A-C show snapshots during the movement of a first light bar above a deflecting element;

FIGS. 3A-C show snapshots during the movement of a second light bar above the deflecting element;

FIGS. 4A, B illustrate the testing of an individual optical waveguide, and

Figure 5:
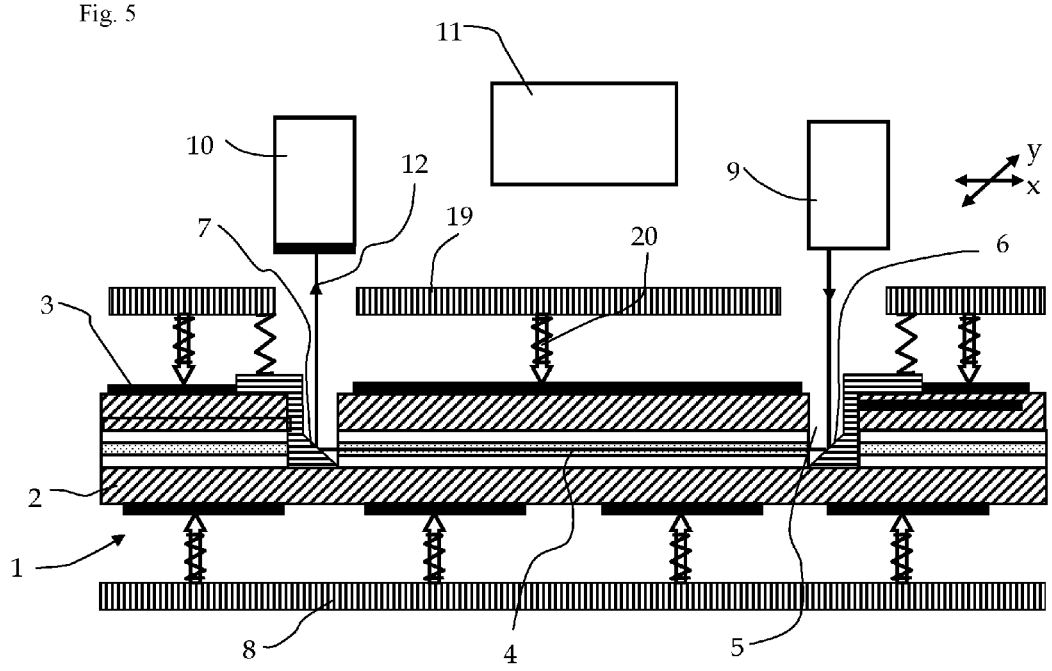

FIG. 5 shows a further test apparatus.

DETAILED DESCRIPTION OF THE INVENTION

FIG. 1 schematically shows a test apparatus in accordance with the invention for electro-optical printed circuit boards, wherein the electro-optical printed circuit board is not shown true to scale but on an enlarged scale for reasons of clarity of the illustration. The electro-optical printed circuit board 1 substantially consists of a substrate 2, to which the electrical conductor 3 and the optical waveguide 4 are applied. The electro-optical printed circuit board 1 may comprise one or several complex optical and electrical layers with a large number of optical waveguides 4. The optical waveguides 4 open into cavities 5, in which a deflecting element is rigidly inserted or can be inserted temporarily for test purposes. They can also be guided up to the edge. The deflecting element comprises at least one deflecting mirror whose mirror surface can be shaped according to the respective optical requirements. Each optical waveguide 4 is thus associated with two deflecting mirrors, i.e. a deflecting mirror of a first deflecting element 6 and a deflecting mirror of a second deflecting element 7, which serve to feed light impinging perpendicularly on the surface of the circuit board 1 into the optical waveguide 4 and to couple out said light again in the direction extending perpendicularly to the surface of the circuit board 1.

The test apparatus comprises a retainer 8 for accommodating the circuit board 1, a beamer 9, a camera 10 and a control device 11. The camera 10 and the beamer 9 can be arranged in a stationary manner, but are preferably displaceable in a manual manner or controlled by respective motors in two directions extending parallel to the retainer 8 or the surface of the circuit board 1, respectively, so that the beamer 9 and the camera 10 can be positioned in such a way that light (or light beam) emitted by the beamer 9 can be fed by means of the deflecting mirrors of the two deflecting elements 6 and 7 into the optical waveguide 4 of the circuit board 1 and can be coupled out to the field of vision of the camera 10. Such a beam path 12 is shown in FIG. 1. The beamer 9 is a digital projector which produces images composed of pixels, wherein each pixel is a bright point of light or black. The wavelength of the light projected by the beamer 9 comprises the range in which the optical waveguides 4 operate, i.e. the beamer 9 generates light as required in the visible and/or infrared and/or ultraviolet spectral range. The control device 11 controls the beamer 9 and the camera 10 and evaluates the results of the measurement. The control device 11 is set up to produce with the beamer 9 images with at least one first light bar and/or with at least one second light bar and/or with at least one light spot. At least a part of the control device 11 and the beamer 9 thus form a light pattern generator. Each of the first light bars is characterized by a first coordinate which characterizes its position within the image along a first direction and an orientation which extends orthogonally to the first direction. Each of the second light bars is characterized by a second coordinate which characterizes its position within the image along a second direction and an orientation which extends orthogonally to the second direction. The first and second directions preferably extend orthogonally with respect to each other. Each light bar has a predetermined width and length. Each light spot is a bright square spot for example or a bright round spot of predetermined size, wherein other geometries are also possible. Each light spot is associated with a first and second coordinate which characterizes its position in the image.

The operating of the test apparatus is described below by reference to an embodiment of a circuit board 1, which comprises several optical waveguides 4 whose one end opens into a first cavity 5 and whose other end opens into a second cavity 5, wherein a first deflecting element 6 is inserted into the first cavity 5 and a second deflecting element 7 into the second cavity 5.

In a preparation step the beamer 9 is positioned in such a way that the image projected by said beamer falls on the first deflecting element 6, and the camera 10 is positioned in such a way that the second deflecting element 7 is situated in its field of vision. The camera 10 thus records images of the second deflecting element 7.

In a first phase the beamer 9 is used to determine for each deflecting mirror of the first deflecting element 6 the position which a light spot needs to assume in the image projected by the beamer 9 so that the light spot illuminates the deflecting mirror. The size of the light spot is dimensioned in such a way that at correct positioning within the image produced by the beamer 9 it only illuminates the selected deflecting mirror but not the adjacent deflecting mirrors. In a second phase the beamer 9 is used to illuminate at least one deflecting mirror in a selective fashion with the light spot associated therewith and to perform the test of the optical waveguide associated with the at least one deflecting mirror. The control of the beamer 9 by the control device 11 according to these tasks is explained below in closer detail.

The control device 11 is set up in a first phase
A) to move a first light bar 13 projected with the beamer 9 step-by-step along a first direction over the first deflecting element 6 and to take in each step an image with the camera 10, wherein the first light bar 13 extends orthogonally to the first direction;

The beamer 9 thus generates one image after the other controlled by the control device 11, wherein the first light bar 13 has a different position in each image. This position moves along the first direction. Each image supplied by the camera is associated with an image of the beamer 9 and thus a first coordinate which characterizes the position of the light bar 13 along the first direction. Once the light bar 13 impinges on one or several deflecting mirrors 14 of the first deflecting element 6, the light is transmitted via the associated optical waveguide or waveguides 4 to the associated deflecting mirror(s) 14 of the second deflecting element 7, so that said deflecting mirror(s) 14 light up.
B) to pick as a first set of images the images from the images supplied by the camera 10 in which at least one deflecting mirror 14 of the deflecting element 7 lights up;

FIGS. 2A to 2C illustrate the steps A and B. These figures schematically show a circuit board 1 with four optical waveguides 4 and the two deflecting elements 6, 7 with four respective deflecting mirrors 14, and the first light bar 13. The ends of the optical waveguides 4 and the deflecting mirrors 14 are arranged at a predetermined distance from each other. The area assumed by the image of the beamer 9 on the circuit board 1 is marked by a dashed border 15 and the field of vision of the camera 10 is marked by a dashed border 16. The first direction is designated here as the X direction and the second direction as the Y direction. FIG. 2A shows a snapshot in which the first light bar 13 is situated on the one side (i.e. here the left side) of the deflecting mirror 14 of the first deflecting element 6 and does not illuminate its deflecting mirrors 14. The deflecting mirrors 14 of the second deflecting element 7 do therefore not light up, i.e. they are dark. FIG. 2B shows a snapshot in which the first light bar 13 falls on all deflecting mirrors 14 of the first deflecting element 6 and illuminates said deflecting mirrors. The deflecting mirrors 14 of the second deflecting element 7 light therefore up, i.e. they are bright. FIG. 2C shows a snapshot in which the first light bar 13 is situated on the other side (i.e. here the right side) of the deflecting mirrors 14 of the first deflecting element 6 and does not illuminate its deflecting mirrors 14. The deflecting mirrors 14 of the second deflecting element 7 do therefore not light up. In this example, the first set of images contains only one single image because the first light bar 13 either illuminates all or none of the deflecting mirrors 14 of the first deflecting element 6.

C) to move a second light bar 17 projected with the beamer 9 step-by-step along a second direction over the first deflecting element 6 and to take in each step an image with the camera 10, wherein the second light bar 17 extends orthogonally to the second direction;

The width and the length of the second light bar 17 are preferably equal to the width and the length of the first light bar 13. Each image of the beamer 9 is assigned a different position of the second light bar 17 along the second direction and thus a different second coordinate of the second light bar 17.

D) to pick as a second set of images the images from the images supplied by the camera 10 in which at least one deflecting mirror 14 of the second deflecting element 7 lights up;

FIGS. 3A to 3C illustrate the steps C and D. FIG. 3A shows a snapshot in which the second light bar 17 is situated on the upper side of the deflecting mirror 14 of the first deflecting element 6 and does not illuminate its deflecting mirrors 14. The deflecting mirrors 14 of the second deflecting element 7 do therefore not light up. FIG. 3B shows a snapshot in which the second light bar 17 is situated above the first deflecting mirror of the first deflecting element 6 and therefore illuminates said deflecting mirror. The first deflecting mirror of the second deflecting element 7 therefore lights up. The other deflecting mirrors are dark. FIG. 3C shows a snapshot in which the second light bar 17 is situated above the second deflecting mirror of the first deflecting element 6 and illuminates said deflecting mirror. The second deflecting mirror of the second deflecting element 7 therefore lights up. The other deflecting mirrors are dark. In the illustrated embodiment, the set of second images contains four images because the light bar at the given step only illuminates one deflecting mirror 14 of the first deflecting element 6.

E) to determine from the first and the second set of images for each of the optical waveguides 4 to be tested the position which a light spot needs to assume in the image generated by the beamer 9 so that the light spot exclusively illuminates the deflecting mirror 14 of the first deflecting element 6 which is associated with the optical waveguide 4 to be tested.

Two possibilities for the step E are explained below in closer detail.

The first possibility consists of superimposing the images of the first set of images with the images of the second set of images, and of determining the intersecting areas or intersecting points where the light bars of the images of the first set and the light bars of the images of the second set cross each other. Since the light bars of the images of the first set extend orthogonally to the first direction and the light bars of the second set extend orthogonally to the second direction, there are such intersecting areas or intersecting points. An image is produced for the beamer 9 for each intersecting area or intersecting point which contains a light spot at the location of the intersecting point or intersecting area, whose size is dimensioned in such a way that it illuminates a single deflecting mirror 14 but not adjoining deflecting mirrors 14.

The second possibility is determining those first coordinates of the first light bar 13 which are associated with the images of the first set of images, and determining those second coordinates of the second light bar 17 which are associated with the images of the second set of images.

The set of first images only contains one single image in the example shown here. Only one single first coordinate thus needs to be determined. All deflecting mirrors 14 of the first deflecting element 6 have the same X coordinate. Said first coordinate is the X coordinate which is assumed by the first light bar 13 in the state shown in FIG. 2B. Said first coordinate is designated with $x_1$.

The second coordinates are the Y coordinates which are assumed by the second light bar 17 in two further states as shown in FIGS. 3B and 3C and in this example. There are four second coordinates in this example with four optical waveguides 4. These four coordinates are designated with $y_1$, $y_2$, $y_3$ and $y_4$.

Pairs of coordinates are formed from the first and second coordinates on the basis of the determined first coordinates and the determined second coordinates. The pairs of coordinates characterize the positions which the light spots need to assume in the image produced by the beamer 9, so that each light spot illuminates a deflecting mirror 14 of the first deflecting element 6 and its light is thus fed into the optical waveguide 4 associated with the deflecting mirror 14. There are four pairs of coordinates in this example, namely $(x_1, y_1)$, $(x_1, y_2)$, $(x_1, y_3)$ and $(x_1, y_4)$.

The control device 11 is further set up in the second phase
F) to project a light spot 18 onto the deflecting mirror 14 of the first deflecting element 6, which mirror is associated with the optical waveguide 4 to be tested, on the basis of the position information determined in the first phase for each optical waveguide 4 to be tested, wherein the light spot 18 does not illuminate any deflecting mirror which is associated with an optical waveguide adjacent to the optical waveguide 4 to be tested, to record an image with the camera 10 and to determine the quality of the optical waveguide 4 on the basis of the image.

Figure 4B:
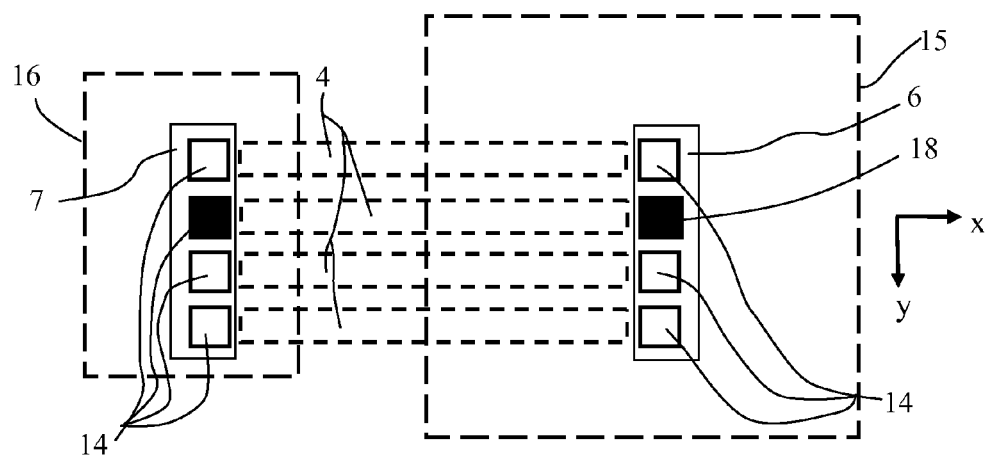

FIGS. 4A and 4B illustrate this phase. FIG. 4A shows the state in which a light spot 18 illuminates the first deflecting mirror. The quality of the associated optical waveguide 4, i.e. the first one, is determined on the basis of the image taken by the camera 10 in this state. FIG. 4B shows the state in which a light spot 18 illuminates the second deflecting mirror. The quality of the associated optical waveguide 4, i.e. the second one, is determined on the basis of the image taken by the camera 10 in this state, etc.

Since each deflecting mirror of the first deflecting element 6 can be illuminated individually, any potential cross-coupling between the optical waveguides 4 can be detected. In the event of a cross-coupling, not only the deflecting mirror of the second deflecting element 7 associated with the tested optical waveguide 4 lights up but also an adjacent deflecting mirror.

The test speed can be increased when several deflecting mirrors which belong to the optical waveguides 4 and between which cross-coupling can be excluded for geometrical reasons are illuminated simultaneously.

The invention was described by reference to a simple embodiment. A complex electro-optical printed circuit board can contain a plurality of optical waveguides 4 whose ends are located at different locations, so that a plurality of cavities 5 and deflecting elements are also present. The test apparatus can be set up in such a way that it is able to perform the aforementioned steps in parallel both in the first phase and also in the second phase for several optical waveguides in so far as the optical test is not impaired, e.g. by cross-couplings.

The test apparatus in accordance with the invention is suitable for
checking the quality of the optical waveguides 4;
checking complex optical systems such as splitters and combiners, which are also known as N×1 couplers;
detecting potential cross-couplings;

additionally checking the correct position of the deflecting mirrors relative to other features on the electro-optical printed circuit board,
and all this at very high speed.

A splitter consists of an optical waveguide system with an input and two or more outputs. It can be designed in such a way that the light energy is distributed equally among the outputs, but it is also possible to provide a different distribution. A combiner consists of an optical waveguide system with two or more inputs and an output. In the case of a splitter, on the input side a deflecting mirror of the first deflecting element 6 is illuminated and it is checked whether the brightness of the deflecting mirrors lighting up on the output side corresponds to the specification. In the case of a combiner, on the input side one deflecting mirror after the other is illuminated and it is checked whether the differences in the brightness of the deflecting mirrors on the output side do not exceed a predetermined value.

The calibration of the test apparatus can be made for example by means of an electrooptical reference circuit board whose properties were determined beforehand in a conventional manner.

FIG. 5 shows an embodiment of the test apparatus which is suitable for testing optical waveguides 4 with a horizontal coupling. The test apparatus contains at least one adapter plate 19 with resiliently mounted deflecting element 6, 7 which are introduced automatically into the cavities 5 during the test. As is also illustrated, the adapter plate 19 can further comprise needles 20 which make contact with the electrical conductors 3, so that both the electrical as well as the optical properties of the electro-optical printed circuit board 1 can be checked. One of the adapter plates 19 is integrated in the retainer 8 in this test apparatus.

The test apparatus in accordance with the invention offers the advantage that the precise alignment of the light source which produces the light spots for illuminating the deflecting mirrors does not occur mechanically but through software by means of a beamer. The use of a beamer allows precise measurement of the properties of the optical waveguides without requiring the beamer to be aligned precisely. The test time is thus reduced considerably.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except by the appended claims and their equivalents.

What is claimed is:

1. A test apparatus for electro-optical printed circuit boards having optical waveguides, the test apparatus comprising
   a retainer for accommodating an electro-optical printed circuit board, a beamer, a camera, and
   a controller, wherein the beamer and the camera are configured to be positioned in such a way that light emitted by the beamer may be fed by means of at least one deflecting element into one or more of the optical waveguides of the electro-optical printed circuit board and may be coupled out into a field of vision of the camera by means of at least one further deflecting element, wherein each of the deflecting elements contains several deflecting mirrors and wherein each optical waveguide of the electro-optical printed circuit board is associated with a deflecting mirror of a first deflecting element and a deflecting mirror of a second deflecting element, and wherein the controller is configured in a first phase to control the beamer such that the beamer produces a first sequence of images to project and move a first light bar step-by-step along a first direction over the first deflecting element and to take in each step an image with the camera to generate a first plurality of recorded images, wherein the first light bar extends orthogonally to the first direction;
   to pick as a first set of images those images from the first plurality of recorded images taken by the camera in which at least one deflecting mirror of the second deflecting element lights up;
   to control the beamer such that the beamer produces a second sequence of images to project and move a second light bar step-by-step along a second direction over the first deflecting element and to take in each step an image with the camera to generate a second plurality of recorded images, wherein the second light bar extends orthogonally to the second direction;
   to pick as a second set of images those images from the second plurality of recorded images taken by the camera in which at least one deflecting mirror of the second deflecting element lights up, and
   to determine from the first set of images and the second set of images picked by the controller for each of the optical waveguides to be tested a position which a light spot needs to assume in an image generated by the beamer so that the light spot exclusively illuminates the deflecting mirror of the first deflecting element which is associated with the optical waveguide to be tested;
   and wherein in a second phase the controller is set up for each of the optical waveguides to be tested
   to control the beamer such that the beamer produces a projected image with a light spot the light spot having in the projected image the position determined in the first phase so that the light spot illuminates the deflecting mirror associated with the optical waveguide to be tested and does not illuminate any deflecting mirror which is associated with an optical waveguide adjacent to the optical waveguide to be tested, to record an a test image using the camera, and
   to determine a quality of the optical waveguide on the basis of the test image.

2. The test apparatus according to claim 1, further configured to detect potential cross coupling between the optical waveguide to be tested and another of the optical waveguides on the basis of the test image.

3. The test apparatus according to claim 2, further comprising at least one adapter plate with resiliently mounted deflecting elements configured to be automatically introduced into cavities of the electro-optical printed circuit board during a test.

4. The test apparatus according to claim 3, wherein at least one of the adapter plates comprises needles in order to make contact with one or more electrical conductors of the electro-optical printed circuit board.

5. The test apparatus according to claim 1, further comprising at least one adapter plate with resiliently mounted deflecting elements configured to be automatically introduced into cavities of the electro-optical printed circuit board during a test.

6. The test apparatus according to claim 5, wherein at least one of the adapter plates comprises needles in order to make contact with one or more electrical conductors of the electro-optical printed circuit board.

* * * * *